United States Patent
Brunnmayr (10) Patent No.: US 9,797,175 B2
(45) Date of Patent: Oct. 24, 2017

(54) DRIVE DEVICE FOR A MOVABLE FURNITURE PART

(71) Applicant: Julius Blum GmbH, Hoechst (AT)

(72) Inventor: Harald Brunnmayr, Hoerbranz (AT)

(73) Assignee: JULIUS BLUM GMBH, Hoechst (AT)

( * ) Notice: Subject to any disclaimer, the term of this patent is extended or adjusted under 35 U.S.C. 154(b) by 84 days.

(21) Appl. No.: 14/848,613

(22) Filed: Sep. 9, 2015

(65) Prior Publication Data
US 2015/0376927 A1 Dec. 31, 2015

Related U.S. Application Data

(63) Continuation of application No. PCT/AT2014/000061, filed on Mar. 26, 2014.

(30) Foreign Application Priority Data

Apr. 12, 2013 (AT) .................................. A 294/2013

(51) Int. Cl.
*A47B 88/00* (2017.01)
*A47B 88/04* (2006.01)
(Continued)

(52) U.S. Cl.
CPC .............. *E05F 3/22* (2013.01); *A47B 88/463* (2017.01); *E05F 1/16* (2013.01); *E05F 5/003* (2013.01);
(Continued)

(58) Field of Classification Search
CPC ....... A47B 88/04; A47B 88/16; A47B 88/047; A47B 88/0477; A47B 88/0481
See application file for complete search history.

(56) References Cited

U.S. PATENT DOCUMENTS

| | | | | | |
|---|---|---|---|---|---|
| 4,657,292 | A | * | 4/1987 | Bruck | ..................... E05B 77/06 292/80 |
| 7,845,050 | B2 | * | 12/2010 | Pyo | .......................... E05F 5/02 16/82 |

(Continued)

FOREIGN PATENT DOCUMENTS

| AT | 12 633 | 9/2012 |
|---|---|---|
| AT | 511 938 | 4/2013 |

(Continued)

OTHER PUBLICATIONS

Search Report dated Sep. 1, 2016 in corresponding Chinese Application No. 201480020585.1.

(Continued)

*Primary Examiner* — Leslie A Nicholson, III
*Assistant Examiner* — Kimberley S Wright
(74) *Attorney, Agent, or Firm* — Wenderoth, Lind & Ponack, L.L.P.

(57) ABSTRACT

A drive device for a movable furniture part includes a lockable push-out device for pushing the movable furniture part out of a closed position into an open position. The push-out device can be unlocked by virtue of the movable furniture part being pushed into an excess-pressure position located behind the closed position, as seen in the closing direction. An excess-pressure region is located between the closed position and an excess-pressure position. The drive device also has a damping device for damping the closing movement of the movable furniture part. The damping device has displacement-dependent damping, in which the damping force in a main damping region, located in front of the closed position—as seen in the opening direction, is higher than in the excess-pressure region.

25 Claims, 5 Drawing Sheets

(51) Int. Cl.
  *E05F 3/22*     (2006.01)
  *E05F 5/00*     (2017.01)
  *E05F 1/16*     (2006.01)
  *F16F 15/023*   (2006.01)
  *A47B 88/463*   (2017.01)
  *A47B 88/47*    (2017.01)

(52) U.S. Cl.
  CPC ............ *F16F 15/023* (2013.01); *A47B 88/47* (2017.01); *A47B 2210/0094* (2013.01); *E05Y 2201/22* (2013.01); *E05Y 2201/232* (2013.01); *E05Y 2800/11* (2013.01); *E05Y 2800/24* (2013.01)

(56) References Cited

U.S. PATENT DOCUMENTS

| | | | | |
|---|---|---|---|---|
| 8,783,799 | B2* | 7/2014 | Chen | A47B 88/463 312/319.1 |
| 2003/0075845 | A1* | 4/2003 | Krammer | F16F 9/348 267/64.11 |
| 2003/0141638 | A1 | 7/2003 | Salice | |
| 2006/0118371 | A1 | 6/2006 | Zimmer et al. | |
| 2007/0090735 | A1* | 4/2007 | Hashemi | A47B 88/0477 312/334.46 |
| 2007/0101539 | A1* | 5/2007 | Sutterlutti | A47B 88/0414 16/49 |
| 2007/0222346 | A1* | 9/2007 | Kleinsasser | A47B 88/0477 312/205 |
| 2008/0191592 | A1* | 8/2008 | Dubach | A47B 88/0477 312/319.1 |
| 2008/0245630 | A1* | 10/2008 | Le | F16F 9/064 188/280 |
| 2009/0072687 | A1* | 3/2009 | Fitz | A47B 88/0477 312/319.5 |
| 2009/0309470 | A1* | 12/2009 | Ruter | A47B 88/047 312/334.1 |
| 2011/0156561 | A1* | 6/2011 | Salice | A47B 88/0481 312/319.1 |
| 2011/0210653 | A1* | 9/2011 | Salice | A47B 88/0481 312/319.1 |
| 2011/0254416 | A1* | 10/2011 | Salice | A47B 88/0481 312/319.1 |
| 2012/0002907 | A1* | 1/2012 | Rehage | A47B 88/047 384/20 |
| 2012/0038255 | A1* | 2/2012 | Netzer | A47B 88/0477 312/319.1 |
| 2014/0210329 | A1* | 7/2014 | Brunnmayr | A47B 88/16 312/333 |
| 2014/0300262 | A1* | 10/2014 | Flogaus | A47B 88/0481 312/319.1 |
| 2014/0319986 | A1 | 10/2014 | Brunnmayr | |
| 2015/0091427 | A1* | 4/2015 | Haemmerle | A47B 88/04 312/333 |
| 2015/0097473 | A1* | 4/2015 | Brunnmayr | A47B 88/0477 312/319.1 |
| 2015/0098667 | A1* | 4/2015 | Brunnmayr | A47B 88/04 384/21 |
| 2015/0204129 | A1* | 7/2015 | Park | E05F 5/003 16/51 |
| 2015/0374123 | A1* | 12/2015 | Goetz | A47B 88/0477 312/319.1 |
| 2015/0374124 | A1* | 12/2015 | Brunnmayr | A47B 88/0477 312/319.1 |
| 2015/0374125 | A1* | 12/2015 | Goetz | A47B 88/0477 312/319.1 |
| 2016/0007748 | A1* | 1/2016 | Gasser | A47B 88/0477 312/319.1 |

FOREIGN PATENT DOCUMENTS

| | | | | |
|---|---|---|---|---|
| AT | WO 2013096980 | A1 * | 7/2013 | ......... A47B 88/0481 |
| CN | 201542088 | | 8/2010 | |
| DE | 103 13 659 | | 9/2004 | |
| DE | 10 2010 036 902 | | 2/2011 | |
| DE | 20 2010 013 193 | | 5/2012 | |
| EP | 0 766 939 | | 4/1997 | |
| EP | 2 364 614 | | 9/2011 | |
| IT | WO 2010009780 | A1 * | 1/2010 | ......... A47B 88/0414 |
| JP | 2006-42971 | | 2/2006 | |
| JP | 2007-252491 | | 10/2007 | |
| WO | 03/081077 | | 10/2003 | |
| WO | 2009/010138 | | 1/2009 | |
| WO | 2011/015663 | | 2/2011 | |
| WO | 2012/084593 | | 6/2012 | |

OTHER PUBLICATIONS

International Search Report dated Jun. 16, 2014 in corresponding International Application No. PCT/AT2014/000061 (with English translation).

Austrian Search Report dated Dec. 10, 2013 in corresponding Austrian Patent Application No. 294/2013 (with English translation).

\* cited by examiner

DRIVE DEVICE FOR A MOVABLE FURNITURE PART

BACKGROUND OF THE INVENTION

The invention concerns a drive device for a moveable furniture part comprising a lockable ejection device for ejection of the moveable furniture part from a closed position into an open position. The ejection device can be unlocked by over-pressing of the moveable furniture part into an over-pressing position which is behind the closed position in the closing direction. An over-pressing region is located between the closed position and the over-pressing position, and a damping device is provided for damping the closing movement of the moveable furniture part. The invention further concerns an article of furniture having such a drive device.

Drive devices have already been known for many years in the furniture fitting industry, with which by pressing against a moveable furniture part (for example a draw) unlocking of that moveable furniture part from the furniture carcass takes place and then the moveable furniture part is opened or actively ejected. For that purpose, such drive devices have a so-called touch latch mechanism. With that mechanism, the movement for closing the drawer from the open position and the movement for unlocking or opening the drawer from the closed position are in the same direction, namely in the closing direction. In the case of normal soft closure (manually or by a retraction device), the drawer or the moveable furniture part is held at the end of the closing movement in the closed position by a locking device. If however the drawer is pushed shut excessively firmly or if it is pushed through as far as an end abutment (this corresponds to the over-pressing position), the ejection device can no longer lock at all or is immediately triggered again, whereby there is no guarantee of the drawer being securely closed in the event of such incorrect operation of the moveable furniture part.

To resolve that problem, a blocking element is known from Austrian patent application A 52/2012 (which is of earlier priority date but which is not a prior publication) in order to prevent the movement into the over-pressing position in the event of excessively fast closing movement.

SUMMARY OF THE INVENTION

The object of the present invention is to provide an alternative possible way of preventing the moveable furniture part from being pushed through as far as the end abutment or into the over-pressing position and thus immediate triggering of the ejection device.

That object is attained by a drive device a displacement-dependent damping action, and the damping force in a main damping region which is disposed in front of the closed position—as viewed in the opening direction—is higher than in the over-pressing region. Thus, the movement of the moveable furniture part is strongly inhibited or braked by the damping device immediately before reaching the closed position, and the attainment of the closed position is simulated for an operator who is trying to move the moveable furniture part into the closed position with a high level of force that he applies. As a result, the operator no longer continues to press against the moveable furniture part and thus unwanted and immediate re-triggering of the ejection device is prevented.

In principle, it is to be noted that the damping force of the damping device is dependent on the closing speed of the moveable furniture part. The weight of the moveable furniture part (with load) and the damping length of the damping device have an additional influence on the action of the damping device. The damping device automatically levels itself, that is to say the higher the closing speed or the weight of the moveable furniture part, the correspondingly higher is the damping force of the damping device. At a low closing speed, only a little damping force has to be applied. Preferably, the damping devices are designed so that, in the case of a moveable furniture part loaded with 40 kg, at a closing speed of 0.4 m/s and with a damping length (cylinder size) of 26 mm, the moveable furniture part is braked to 0 m/s—without hitting against the end of the damping device. The damping force which can be measured or determined in the damping device is specified in this application in Newtons (abbreviation: N).

In a preferred embodiment of the invention, in the main damping region, the damping force at a closing speed of 0.4 m/s is at least 35 N, preferably between 45 N and 130 N. The attainment of the closed position in the event of undesirable over-pressing can be imitated by that relatively high damping force in contrast to previously known damping devices for drive devices of moveable furniture parts.

In order, however, not to prevent the desired unlocking or ejection of the drive device it is preferable that in the over-pressing region the damping force at a closing speed of 0.4 m/s is between 0 N and 5 N. Expressed as a relative comparison, the damping force in the main damping region is at least five times, preferably at least twelve times, the damping force in the over-pressing region.

For a soft damping operation which is as uniform as possible, it is preferable that in the closing direction a pre-damping region is in front of the main damping region, the damping force in the main damping region being higher than in the pre-damping region. Particularly preferably in that case in the pre-damping region, the damping force at a closing speed of 0.4 m/s is between 5 N and 35 N. In that case, as a relative indication, the damping force in the main damping region can be higher than in the pre-damping region by at least 50%, preferably by at least 100%.

In addition, to provide a gentle transition between the individual damping regions, the pre-damping region, the main damping region, and the over-pressing region directly adjoin each other.

In principle, the main damping region can be at any location before the closed position. In order, however, to imitate the attainment of the closed position as exactly as possible, the main damping region can end shortly (between about 1 and 15 mm) before or precisely in the closed position.

As an alternative to the definition of the main damping region by way of the Newton units, the damping device can reduce the closing movement of the moveable furniture part in the main damping region before reaching the closed position to a speed of below 0.3 mm/second, preferably to below 0.1 mm/sec. It will be appreciated that that speed specification is heavily dependent on the previous closing speed and the weight of the moveable furniture part. Ideally, with a load in the moveable furniture part of 40 kg and with a closing speed of 0.4 m/s, that speed reduction should be achieved by the end of the main damping region.

It is possible to use in principle damping devices of various lengths. It is preferably provided however that the main damping region is at a maximum 30 mm, preferably between 15 mm and 20 mm, in length.

To make an operator in the event of incorrect operation sufficiently attentive to the attainment of the—imitated— closed position, preferably in the main damping region the damping device damps the closing movement to a speed of below 0.3 mm/second for at least five seconds.

In principle, different kinds of damping devices can be used like, for example, a rotational damper or the like. However, the damping device can have a damping cylinder filled with a damping medium and a damping piston supported moveably in the damping cylinder. To attain the high damping force in the main damping region, preferably the damping cylinder at an inner surface has a constriction which forms the main damping region.

By virtue of the high weight and/or by virtue of the high closing speed, even the maximum damping force of the damping device can be exceeded in the main damping region. In order in that case to prevent damage in the damping device, preferably the damping device has an overload protection mechanism. By way of example, attention is directed for such overload protection mechanisms in damping devices to AT 12633 U1 and WO 03/081077 A1.

Preferably, it is generally provided that the individual damping regions (pre-damping region, main damping region and over-pressing region) are integrated in a single damping unit. The possibility should not also be excluded, however, that the damping device has two damping units operating at least partially in parallel, preferably in the form of piston-cylinder units, and the main damping region is provided in only one of those damping units. That could be appropriate in particular when an existing drive device is to be retrofitted. More specifically in that case, only one further damping unit which has the main damping region would have to be added to the existing damping unit.

Besides an automatic ejection device, the described device can also have a retraction device for retraction of the moveable furniture part from an open position into the closed position. In that respect, preferably the retraction movement triggered by the retraction device can be damped by the damping device. In a normal retraction process, the retraction device in that case overcomes the main damping region and moves the entire drive device into the "true" closed position.

In an article of furniture the drive device can be arranged on the furniture carcass and can actively eject the moveable furniture part. Conversely, the drive device can also be connected to the moveable furniture part and can push itself away against the furniture carcass. The damping device itself does not have to be arranged in the same region as the ejection device. Rather, the damping device can act separately between the furniture carcass and the moveable furniture part. Preferably, the damping device is fixed to the extension guide means and damps the movement of the drawer rail relative to the carcass rail. Particularly preferably, the damping device can be part of a retraction device which in turn can be separate from the ejection device. Basically, it is important that the damping device is arranged anywhere in the region of the moveable furniture part in such a way that the main damping region damps the closing movement of the moveable furniture part shortly before reaching the closed position.

BRIEF DESCRIPTION OF THE DRAWINGS

Further details and advantages of the present invention will be described more fully hereinafter by means of the specific description with reference to the embodiments by way of example illustrated in the drawings, in which.

DETAILED DESCRIPTION OF THE INVENTION

Figure 1:
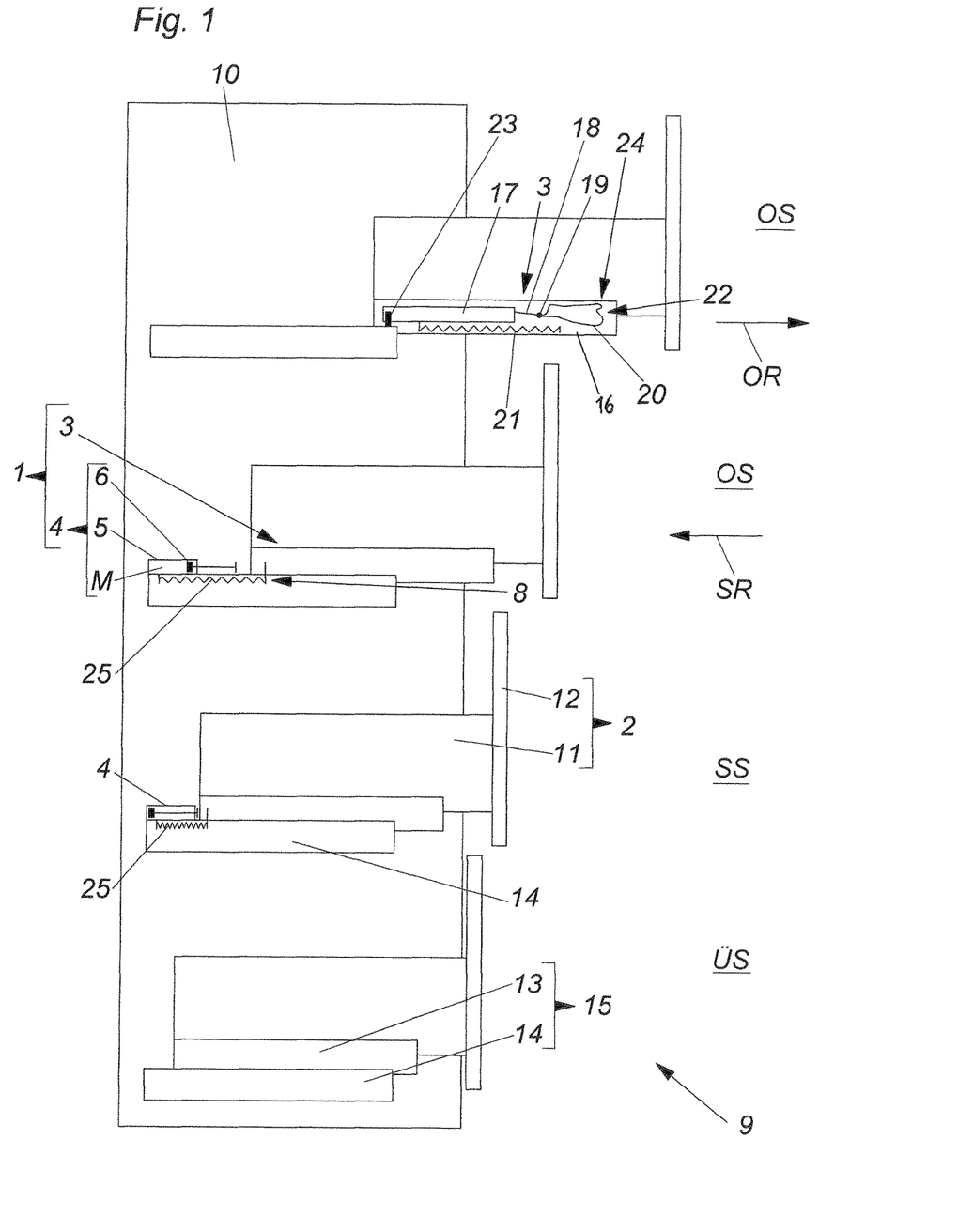
FIG. 1 diagrammatically shows moveable furniture parts in various positions.

FIG. 1 generally shows an article of furniture 9 comprising a furniture carcass 10 and four moveable furniture parts 2 which are respectively disposed in different positions. In a downward direction, the moveable furniture parts 2 (drawers) are in an open position OS, after moving in the closing direction SR in a further open position OS, after further moving in the closing direction SR in the closed position SS and after over-pressing in an over-pressing position ÜS behind the closed position SS. Each moveable furniture part 2 includes a drawer container 11 and a front panel 12. Each moveable furniture part 2 is mounted moveably to the furniture carcass 10 by way of an extension guide 15. The extension guide 15 includes a drawer rail 13 and a carcass rail 14 and optionally a central rail (not shown).

The essential components of the drive device 1 are the lockable ejection device 3 and the damping device 4. As shown in FIG. 1, the ejection device 3 is connected by a base plate 16 to the drawer rail 13 and to the moveable furniture part 2 respectively. The ejection slider 17 is mounted moveably on the base plate 16. The ejection force storage element 21 (as shown in FIG. 1, a compression spring which is not stressed) is fixed on the one hand to the base plate 16 and on the other hand to the ejection slider 17. A locking lever 18 is mounted pivotably to the ejection slider 17, and a locking pin 19 is arranged at the tip of the locking lever 18. That locking pin 19 is guided in a cardioid-shaped guide path 20 in the base plate 16. The entire ejection slider 17 is lockable to the base plate 16 by the locking device 24, and the locking device 24 is formed by the locking pin 19, the cardioid-shaped guide path 20 and its latching recess 22. The ejection slider 17 is connected or can be coupled at least portion-wise to the furniture carcass 10 by the entrainment portion 23 which is fixed with respect to the carcass.

As shown in FIG. 1 the damping device 4 for damping the closing movement of the moveable furniture part 2 is arranged on the carcass rail 14 and has the damping cylinder 5, the damping medium M and the damping piston 6 supported moveably in the damping cylinder 5. In addition, provided in the region of the extension guide 15 is the retraction device 8 which has the retraction force storage element 25 in the form of a tension spring. The damping device 4 has such a configuration that a travel-dependent damping action is provided before reaching the closed position SS over the pre-damping region V and the main damping region H.

Figure 2:
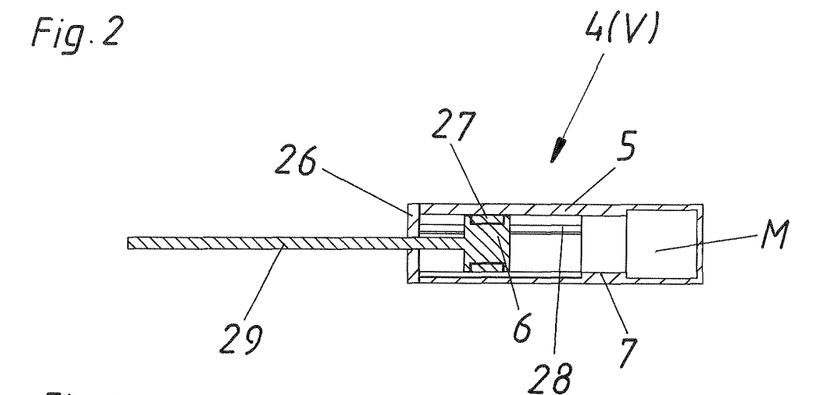
FIG. 2 shows a damping device in the pre-damping region.

In detail in that respect, attention is to be directed to FIG. 2 showing that the damping piston 6 together with the piston rod 29 is mounted moveably in the damping cylinder 5. It can be seen from this sectional view that a sealing ring 27 is arranged around the damping piston 6. In addition, a damping groove 28 is provided at the inner surface of the damping cylinder 5 so that the damping medium M can flow from the side of the damping piston 6 that is remote from the piston rod to the side of the damping piston 6 that is towards the piston rod, and vice-versa. The damping cylinder 5 is closed by the cylinder cover 26 so that the damping medium M cannot issue. In FIG. 2, the damping piston 6 is in the pre-damping region V.

Figure 3:
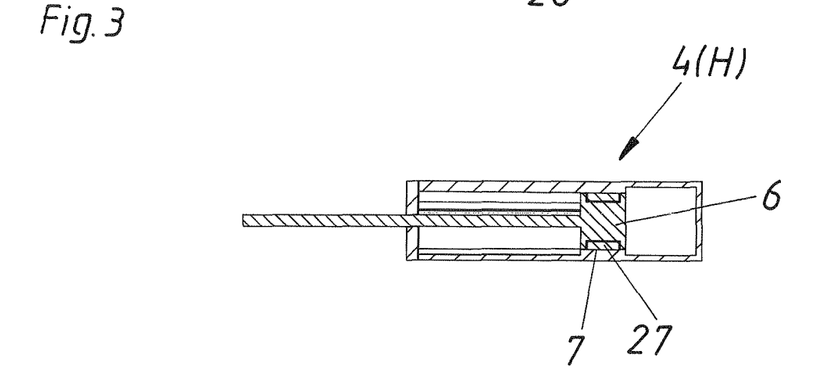
FIG. 3 shows a damping device in the main damping region.

In comparison, in FIG. 3 the damping piston 6 is exactly in the region of the constriction 7 which is provided at the inside of the damping cylinder 5 and which forms the main damping region H. When the damping piston 6 is at that position, the damping action or damping force D is at its greatest.

Figure 4:
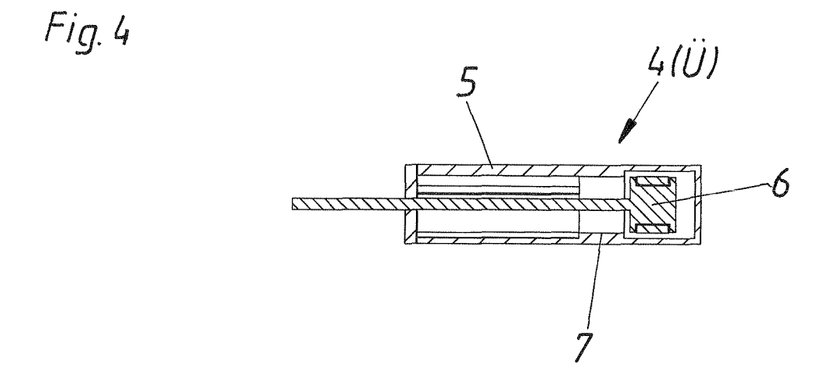
FIG. 4 shows a damping device in the over-pressing region.

After that main damping region H has been passed over, the position shown in FIG. 4 is reached, by the drive device 1 or the moveable furniture part 2 being disposed into the over-pressing region Ü between the closed position and the over-pressing position ÜS. There is scarcely any damping force D on the part of the damping device 4 in that over-pressing region Ü.

Figures 5, 6, 7:
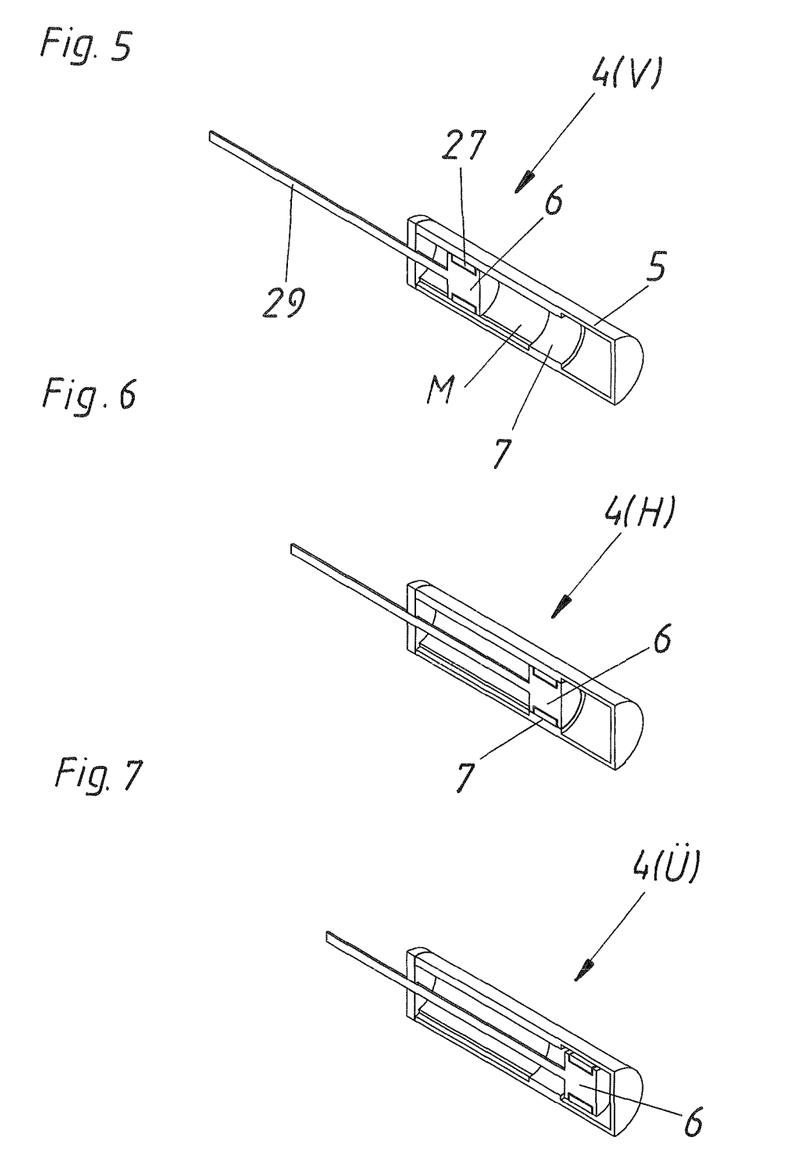
FIGS. 5 through 7 show 3D sectional views of the damping device in various positions.

FIGS. 5 through 7 show 3D sectional views of the damping device 1 corresponding to the positions in FIGS. 2 through 4.

Figure 8:
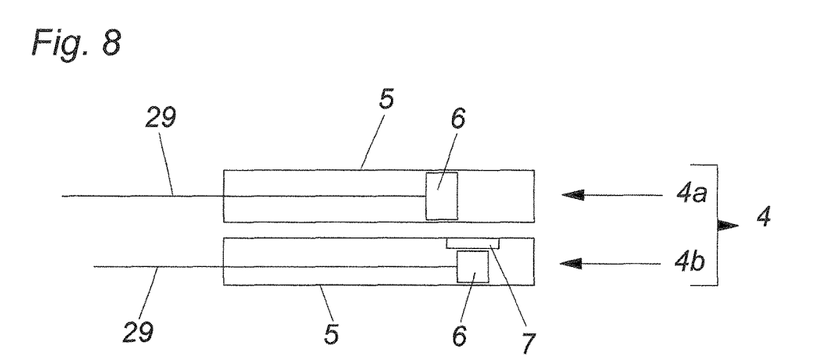
FIG. 8 shows a damping device with two damping units arranged in parallel.

Referring to FIGS. 2 through 7, they show a single piston-cylinder unit (damping unit) including the pre-damping region V, the main damping region H and the over-pressing region Ü. Alternatively or additionally, the damping device 4 however can also comprise two damping units 4a and 4b, wherein as shown in FIG. 8 only the damping unit 4b has the constriction 7 so that this part of the damping unit 4b forms the main damping region H. Such a configuration is appropriate in particular when the damping unit 4b is to be retro-fitted in an already existing drive device 1. What is important is that the sum of the damping forces D of the individual damping units 4a and 4b again produces the desired damping force D for the moveable furniture part 2.

Figure 9:
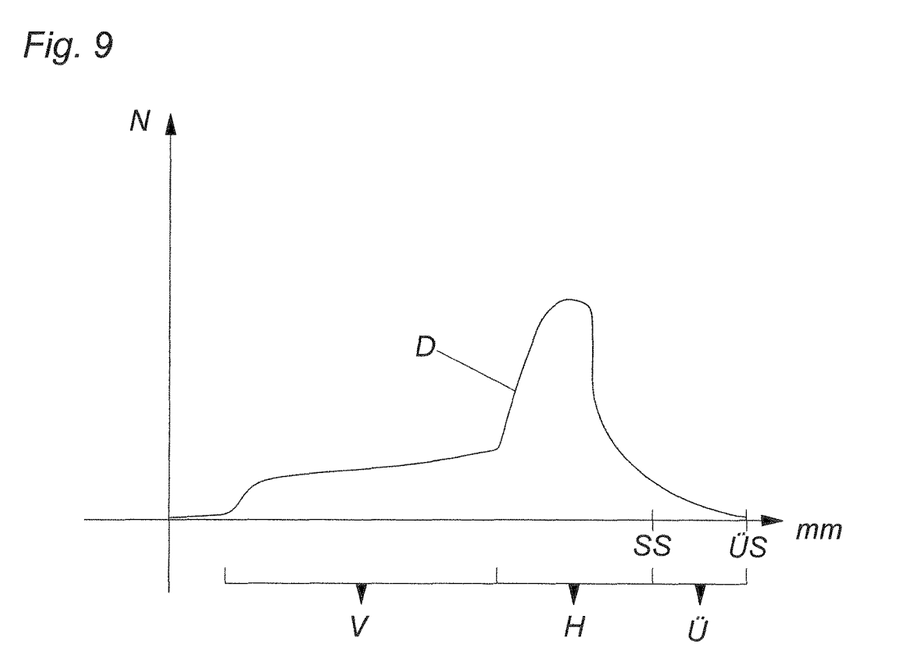
FIG. 9 shows a schematic graph of the damping force.

FIG. 9 schematically shows a graph with the development of the damping force D (given in N) along the closing travel (given in mm) of the moveable furniture part 2. As soon as the moveable furniture part 2 or the drive device 1 encounters the damping device 4 during the movement along the closing travel, the damping force D rises, with the damping device 4 being in a pre-damping region V. Before the closed position SS is reached, the damping force D of the damping device 4 rises greatly and reaches the main damping region H in which, in the event of incorrect operation, the attainment of the closed position is simulated. At the latest when the "true" closed position SS is reached the damping force D falls to a low range again. In the over-pressing region Ü between the closed position SS and the over-pressing position ÜS, the damping force D is again in a range which can be overcome upon desired triggering by applying a low triggering pressure.

Figure 10:
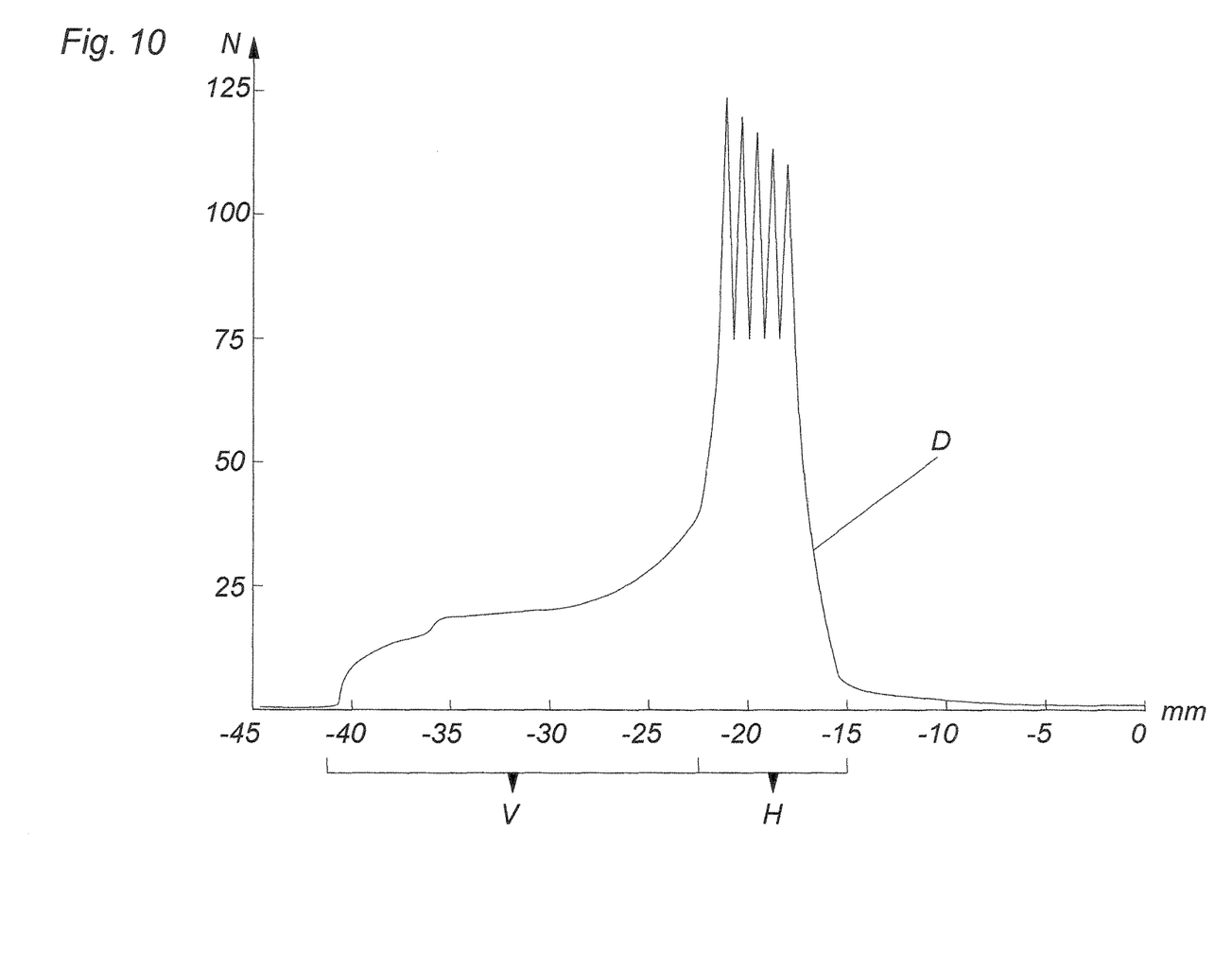
FIG. 10 shows a graph for the damping force on the basis of specific values.

FIG. 10 shows a graph with specific measurement values. The illustrated damping force D was measured at a closing speed of 100 mm/s with a load in the moveable furniture part 2 of 40 kg and with a length for the damping cylinder 5 of 35 mm. As can be seen, with the beginning of the pre-damping region V, the damping force D rises relatively steeply to a value of about 35 N. In that region, the damping force D in itself is speed-dependent. By virtue of the design configuration of the damping device 4, the arrangement provides for automatic leveling of the closing speed of the moveable furniture part 2. As soon as the main damping region H is reached the damping force D rises greatly and at about 125 N reaches the maximum value at which the overload protection mechanism is activated, whereupon the damping force D abruptly drops to about 70 N. That process with the overload peaks is repeated a plurality of times until the main damping region H has been passed over and the damping force D drops practically to 0 N.

Thus the present invention describes a drive device 1 in which travel-dependent damping provides that, in a region before the closed position SS is reached, the damping force D of the damping device 4 is increased so greatly that the attainment of the closed position is simulated for an operator in the event of incorrect operation, thereby providing an alternative kind of over-pressing protection.

The invention claimed is:

1. A drive device for a moveable furniture part, the drive device comprising:
   a lockable ejection device for ejection of the moveable furniture part from a closed position into an open position, the ejection device being configured to be unlocked by over-pressing of the moveable furniture part into an over-pressing position located behind the closed position with respect to a closing direction, an over-pressing region being located between the closed position and the over-pressing position, and
   a damping device for damping a closing movement of the moveable furniture part,
   wherein the damping device is configured to have a displacement-dependent damping action such that a damping force applied by the damping device in a main damping region located in front of the closed position with respect to the closing direction is higher than the damping force applied by the damping device in the over-pressing region, wherein both the damping force applied in the main damping region and the damping force applied in the over-pressing region are greater than zero.

2. The drive device as set forth in claim 1, wherein the damping force is dependent on the closing speed of the closing movement of the moveable furniture part.

3. The drive device as set forth in claim 1, wherein the damping force in the main damping region is at least five times the damping force in the over-pressing region.

4. The drive device as set forth in claim 1, wherein in the main damping region, the damping force at a closing speed of 0.4 m/s is at least 35 N.

5. The drive device as set forth in claim 1, wherein in the over-pressing region, the damping force at a closing speed of 0.4 m/s is between 0 N and 5 N.

6. The drive device as set forth in claim 1, wherein a pre-damping region is in front of the main damping region with respect to the closing direction, the damping force in the main damping region being higher than the damping force in the pre-damping region.

7. The drive device as set forth in claim 6, wherein the damping force in the main damping region is higher than in the pre-damping region by at least 50%.

8. The drive device as set forth in claim 6, wherein in the pre-damping region, the damping force at a closing speed of 0.4 m/s is between 5 N and 35 N.

9. The drive device as set forth in claim 6, wherein the pre-damping region, the main damping region, and the over-pressing region directly adjoin each other.

10. The drive device as set forth in claim 1, wherein the main damping region ends before or precisely in the closed position.

11. The drive device as set forth in claim 1, wherein the main damping region is at a maximum 30 mm in length.

12. The drive device as set forth in claim 1, wherein the damping device includes a damping cylinder filled with a damping medium and a damping piston supported moveably in the damping cylinder.

13. The drive device as set forth in claim 12, wherein the damping cylinder has an inner surface, the inner surface having a constriction which forms the main damping region.

14. The drive device as set forth in claim 1, wherein the damping device includes an overload protection mechanism.

15. The drive device as set forth in claim 1, wherein the damping device includes two damping units operating at least partially in parallel, wherein the main damping region is provided in only one of those damping units.

16. The drive device as set forth in claim 1, further comprising a retraction device for retraction of the moveable furniture part from the open position into the closed position.

17. An article of furniture comprising a drive device as set forth in claim 1.

18. The article of furniture as set forth in claim 17, wherein the damping device reduces the closing movement of the moveable furniture part in the main damping region before reaching the closed position to a speed of below 0.3 mm/second.

19. The article of furniture as set forth in claim 17, wherein in the main damping region, the damping device damps the closing movement to a speed of below 0.3 mm/second for at least five seconds.

20. The drive device as set forth in claim 3, wherein the damping force in the main damping region is at least twelve times the damping force in the over-pressing region.

21. The drive device as set forth in claim 4, wherein in the main damping region, the damping force at a closing speed of 0.4 m/s is between 45 N and 130 N.

22. The drive device as set forth in claim 6, wherein the damping force in the main damping region is higher than in the pre-damping region by at least 100%.

23. The drive device as set forth in claim 11, wherein the main damping region is between 15 mm and 20 mm in length.

24. The drive device as set forth in claim 15, wherein the two damping units are in the form of piston-cylinder units.

25. The article of furniture as set forth in claim 18, wherein the damping device reduces the closing movement of the moveable furniture part in the main damping region before reaching the closed position to a speed of below 0.1 mm/sec.

* * * * *